United States Patent

Jordan

[15] 3,701,288
[45] Oct. 31, 1972

[54] CONTROL APPARATUS HAVING A FINGER OPERATED DUAL MOTION CONTROL DEVICE

[72] Inventor: David B. Jordan, Wantagh, N.Y.

[73] Assignee: Fairchild Industries, Inc., Germantown, Md.

[22] Filed: Aug. 10, 1970

[21] Appl. No.: 62,494

[52] U.S. Cl. ..............................74/471 XY, 244/83 R
[51] Int. Cl. ................................................G05g 9/04
[58] Field of Search .................74/471 XY; 244/83 R

[56] References Cited

UNITED STATES PATENTS

| | | | |
|---|---|---|---|
| 3,299,731 | 1/1967 | Russell, Jr. | 74/471 XY |
| 3,447,766 | 6/1969 | Palfreyman | 74/471 |
| 3,095,754 | 7/1963 | Mayon et al. | 74/471 XY |
| 3,306,125 | 2/1967 | Purcell et al. | 74/471 XY |
| 3,365,975 | 1/1968 | Hathaway | 74/471 XY |

Primary Examiner—Meyer Perlin
Assistant Examiner—F. D. Shoemaker
Attorney—Michael W. York

[57] ABSTRACT

Control apparatus having a manual control device has two potentiometers located within a housing that are connected through two respective gear trains to an input lever that is adapted to be operated both up and down in substantially a vertical direction and forward and backward in substantially a horizontal direction by finger or thumb pressure. Movement of the input lever in one direction activates one potentiometer and movement of the input lever in another direction activates the other potentiometer. A mounting member is also provided that can be used to mount the control device on an aircraft control stick.

7 Claims, 3 Drawing Figures

PATENTED OCT 31 1972

3,701,288

INVENTOR.
David B. Jordan
BY Michael W. York
ATTORNEY

CONTROL APPARATUS HAVING A FINGER OPERATED DUAL MOTION CONTROL DEVICE

BACKGROUND OF THE INVENTION

Many modern aircraft and other similar vehicles have become so complex that they have a large number of systems that must be activated and controlled during vehicle operation. The large number of these systems places a burden upon the operator of the aircraft or other such vehicle since he must supply numerous appropriate inputs or input signals to control these systems during vehicle operation. This burden becomes substantial when a number of appropriate inputs must be supplied to various systems at or nearly at the same time. These burdens are particularly acute in the case of high performance military aircraft that may have complex armament and radar systems that must be controlled simultaneously with the various flight control systems.

This burden can be greatly alleviated by providing input controls that can be readily activated by the operator of the vehicle without having to make large hand movements, or shift his hands from one control to another, or shift his attention from one type of control system to another. It is also important that any such input control have good sensitivity so that large inputs to the control unit are not required to obtain the desired signal or output. In the past a number of input control systems have been proposed. U.S. Pat. Nos. 2,787,746 and 3,060,362 both describe hand grip controls that can be used to control aircraft that have a number of input switches or the like that can be operated by the thumb or finger of the hand that is grasping the hand grip so that a number of controls can be operated by the operator without having to shift his hand from the hand grip. Although these hand grip controls do reduce the burden on the operator of the vehicle, they require a special hand grip and the thumb or finger of the operator must be moved from one switch, knob or wheel or the like when the operator desires to activate or control another input to a system.

Many types of vehicle systems such as radar target acquisition systems and missile guidance systems require a two axis control input. In radar target acquisition systems, the reticule on the radar scope must be moved both vertically and horizontally to place it on the indicated target on the radar scope. To accomplish this, normally one input switch or knob is required to be activated to control the reticule in a vertical direction and another such switch or knob is required to be activated to control the reticule in a horizontal direction and this requires the operator to shift his thumb or finger from one switch to the other to acquire and hold the target and this may be difficult to accomplish and be time consuming. With such a radar target acquisition system it is also important that the operator be capable of readily controlling the other systems while inputs are being supplied to the radar target acquisition system and this may be difficult if the operator must shift his thumb or finger from one control knob or switch to another to operate the radar target acquisition system.

Various types of systems such as weapons systems and guidance systems are added or subtracted from vehicles such as aircraft according to the intended use for the aircraft or other vehicle and when systems are added the addition of appropriate input control devices are also required. In previous input control systems this has required the modification or replacement of the existing input control systems and this has increased the time and expense associated with the addition of a new system. In view of this, it is highly desirable to have a readily operable input control device that can readily be added to an existing input control system without modifying or altering the existing system. It is also desirable to have an input control device that can readily be removed from the vehicle when it is no longer needed.

The present invention overcomes the problems associated with previous input control devices and provides a control apparatus including a sensitive control device that is easily operated by the thumb or finger of the operator and is capable of simultaneously controlling two inputs.

SUMMARY OF THE INVENTION

This invention relates to manual control apparatus and devices and more particularly to manual control apparatus that have finger operable means for controlling two signal sources.

It is accordingly an object of the present invention to provide a manual control apparatus that includes a device that is capable of easily controlling two signal sources.

It is also an object of the present invention to provide a manual control apparatus that includes a device that is capable of being easily operated by one finger or thumb.

It is also an object of the present invention to provide a control apparatus that includes a manual control device that has good sensitivity.

Another object of the present invention is to provide a control apparatus having a manual control device that is capable of being readily attached to an existing control member.

A further object of the present invention is to provide a control apparatus having a manual control device that is capable of being operated without requiring the operator to remove his hand from another control member.

The present invention provides an aircraft control apparatus including an aircraft control stick with a control grip at its upper end and a mounting member that has its lower portion connected to the aircraft control stick. A control device having a housing is connected to the upper portion of the mounting member and first and second signal source means are located in the housing for each producing an electrical signal. Finger or thumb operable means is operatively connected to both the first and second signal source means for permitting a finger or thumb to be used to control the first and second signal source means and a portion of the finger or thumb operable means extends outside of the housing. The mounting member, the housing, and the portion of the finger or thumb operable means that extends outside of the housing are located with respect to the control grip to permit the portion of the finger or thumb operable means that extends outside of the housing to be readily operated by a finger or thumb of a hand that is grasping the control grip.

BRIEF DESCRIPTION OF THE DRAWINGS

The invention will be hereinafter more fully described with reference to the accompanying drawings in which.

DETAILED DESCRIPTION OF THE PREFERRED EMBODIMENT

Figures 1, 2, 3:
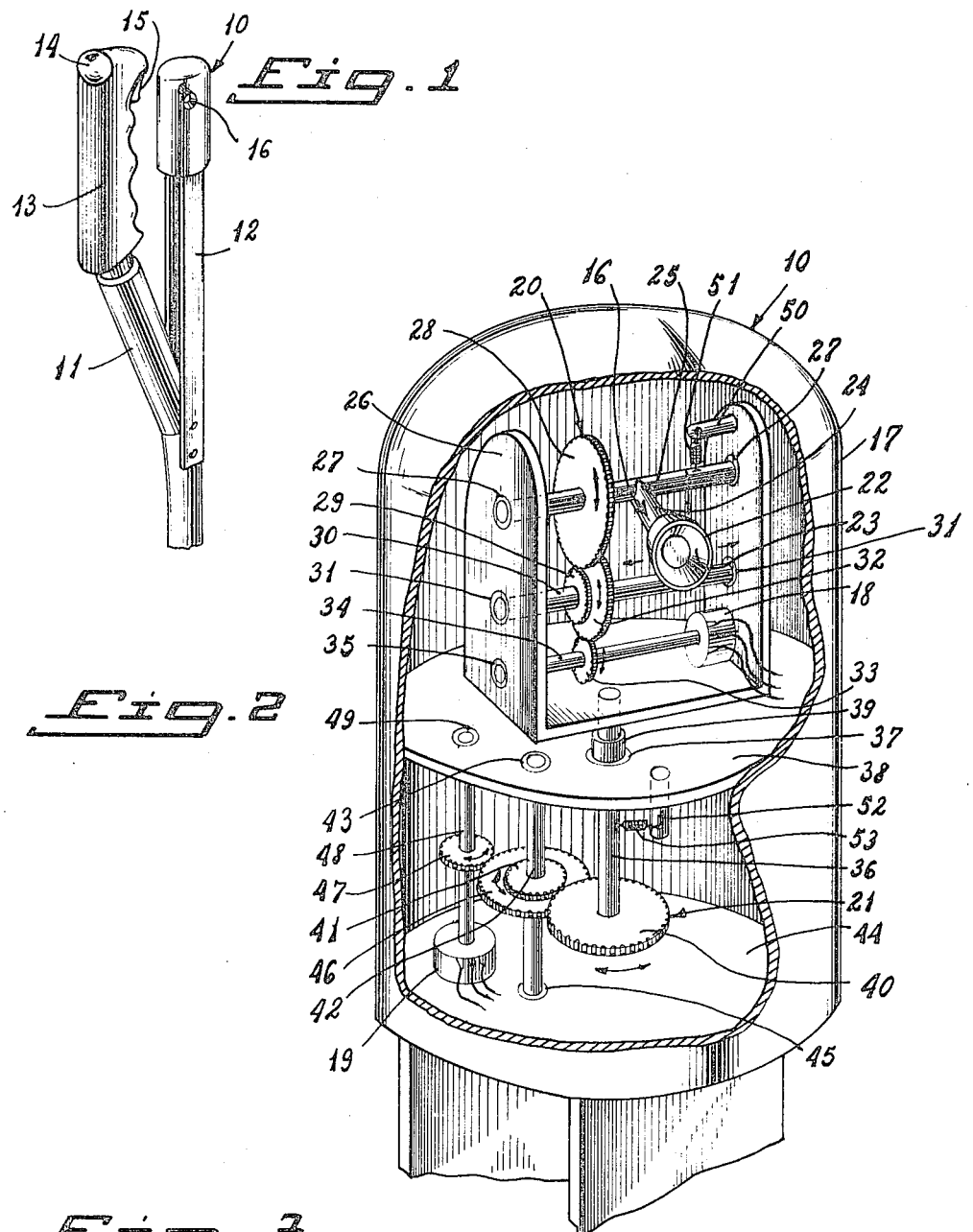
FIG. 1 is a perspective view of the control apparatus of the invention showing a manual control device that forms part of the invention attached to an aircraft control stick.
FIG. 2 is an enlarged perspective view with certain parts broken away of the manual control device illustrated in FIG. 1.
FIG. 3 is a schematic diagram illustrating the use of the manual control device of the invention to control a radar target acquisition system.

Referring first to FIG. 1 a dual motion manual control device 10 is illustrated connected to a conventional aircraft control stick 11 by means of a mounting member 12 whose upper end is connected to the lower end of the control device and whose lower end is connected to the control stick. A conventional aircraft control grip 13 that has a thumb operated switch 14 and a finger operated trigger 15 is connected to the upper end of the control stick 11. The dual motion control device 10 is mounted on the stick 11 by means of the mounting member 12 in such a manner that the control device is located substantially in front of the control grip 13 so that the thumb or finger operable lever 16 is readily operable by the hand that is grasping the grip without the individual releasing the control grip.

The details of the dual motion manual control device 10 are illustrated in FIG. 2. The dual motion manual control device 10 comprises a housing 17, two potentiometers 18 and 19 located within the housing, and two gear trains 20 and 21 located within the housing that are respectively operatively connected to the potentiometers 18 and 19. The dual motion control device also comprises the finger or thumb operable input lever 16 that is operatively connected to the gear trains 19 and 20. The finger or thumb operable lever 16 has an enlarged outer end member 22 that is located outside the housing 17 that has a hole 23 that is adapted to receive a portion of the tip of the finger or thumb of the individual who is operating the control unit. The finger or thumb operable lever 16 also has a shaft 24 whose outer end is connected to the end member 22 and whose inner end is rigidly secured and connected to a rotatable mounting member shaft 25 that is rotatably mounted in a horizontal position on a U-shaped mounting member 26 that is located within the housing 17 by means of the bearings 27 that support the ends of the shaft and are located in the two projecting walls or sides of the mounting member.

A spur gear 28 that is of comparatively large diameter is located on and rigidly connected to the shaft 25 that extends between the walls of the U-shaped mounting member and has its ends rotatably mounted in the walls of the U-shaped mounting member so that upward or downward movement of the lever 16 causes the spur gear to rotate. The spur gear 28 meshes with a smaller diameter spur gear 29 that is located on and rigidly secured to a mounting member shaft 30 that extends between the walls of the U-shaped mounting member and is rotatably mounted in a horizontal position below the shaft 25 on the mounting member 26 by means of the bearings 31 that are mounted in the walls or sides of the mounting member and rotatably support the ends of the shaft. Located adjacent to the comparatively small diameter spur gear 29 is a comparatively large diameter spur gear 33 that is located on and rigidly connected to the shaft 30. The teeth of the spur gear 32 mesh with the teeth of a comparatively small diameter spur gear 33 that is located on and rigidly connected to a mounting member shaft 34 that is rotatably mounted in a horizontal position below the shaft 30 on the mounting member 26 by means of a bearing 35 that is located in the left side or wall of the mounting member and supports one end of the shaft. The other end of the shaft 34 is connected to the potentiometer 18 that is mounted on the right side of the mounting member 26 so that rotation of the shaft 34 causes a change in the resistance of the potentiometer and thus generates an electrical signal when electric current is flowing through the potentiometer. This resulting electric signal can be used to control the deflection of a target reticle on a radar scope either vertically or horizontally or can be used to provide a control input to other types of systems.

The upper end of a vertically mounted mounting shaft 36 is rigidly secured to the bottom of the mounting member 26 and the shaft is free to rotate about its long axis within a bearing 37 that is located in a disc shaped partition 38 whose rim is attached to the inner wall of the housing 17 so that the disc lies substantially in a horizontal plane within the housing. A collar 39 is rigidly mounted on the shaft 36 that is rotatably mounted in and extends through the partition 38 above the bearing 37 and this collar rides on the upper surface of the bearing and serves to support the shaft and the attached mounting member 26 vertically. A relatively large diameter spur gear 40 is rigidly attached to the lower end of the shaft 36 that is opposite the end that is connected to the U-shaped mounting member 26 and rotates with the shaft. The teeth of the spur gear 40 mesh with the teeth of a relatively small diameter spur gear 41 that is located on and rigidly connected to a shaft 42 that is vertically mounted within the housing 17. The upper end of the shaft 42 is rotatably mounted to the partition 38 by means of the bearing 43 and the lower end of this shaft is rotatably mounted to a circular disc shaped floor panel 44 located in the housing that is spaced away from the partition and closes the bottom end of the housing 17 by means of a bearing 45 that is located in the floor panel. A relatively large diameter spur gear 46 is located on the rigidly connected to the shaft 42 that extends between the partition 38 and the panel 44 immediately adjacent to the spur gear 41. The teeth of the spur gear 46 mesh with the teeth of a comparatively small spur gear 47 that is rigidly mounted on a shaft 48 that extends from the partition 38. The shaft 48 is mounted in a vertical position and the upper end of the shaft is rotatably mounted in the partition and is free to rotate within a bearing 49 that is located in the partition 38. The lower end of the shaft 48 that is opposite the end mounted in the partition 38 is connected to the potentiometer 19 that is attached to the floor panel 44 so that rotation of the shaft 48 causes a change in resistance of the potentiometer and thus generates an electric signal when electric current is flowing through the potentiometer. This electric signal can also be used to control the deflection of a target reticle on a radar scope either vertically or horizontally or can be used to provide a control input to other types of systems.

A cylindrical pin 50 is rigidly secured to the inside of the right side of the mounting member 26 so that the pin is located above and has its long axis parallel to the shaft 25. A spring 51 has one end that is connected to a hole in the outer end of the cylindrical pin 50 and its other end is crimped into a slot in the shaft 25 so that as the shaft is rotated away from its neutral position in either direction the spring is stretched so that the tension in the spring will return the shaft 25 to its neutral or unmoved position when the finger operable lever 26 is released. As the shaft 25 returns to its neutral position this causes the attached lever 16 to return to its neutral or unmoved position in the vertical plane. A similar cylindrical pin 52 is rigidly secured to the underside of the partition 38 so that the long axis of the pin is parallel to the shaft 36. A spring 53 has one end that is connected to a hole in the outer end of the cylindrical pin 52 and its other end is crimped into a slot in the shaft 36 so that as the shaft rotates away from its neutral or unmoved position in either direction the spring is stretched so that tension in the spring will return the shaft 36 to its neutral position when the finger operable lever 16 is released. As the shaft 36 returns to its neutral position this causes the mounting member 26 to rotate to cause the connected lever 16 to move to its neutral or unmoved position in the horizontal plane. It of course will be appreciated that the means for returning the lever 16 to its neutral position such as the pins 50 and 52 and the springs 51 and 53 will not be necessary in all applications for the control device.

In order to utilize the invention the operator who is holding the handle 13 merely extends his finger or thumb to engage the lever 16 without releasing his hand grip on the handle. The operator can then insert his finger in the hole 23 in the end of the lever 16 and push the lever forward or backward in a horizontal direction or in a horizontal plane. If the operator pushes forward on the lever 16 this puts pressure on the shaft 25 whose ends are connected to the mounting member 26 by the bearings 27 and this causes the mounting member and the attached shaft 36 to rotate forward. When the shaft 36 rotates in a forward direction this causes the attached relatively large diameter spur gear 40 to rotate in a forward direction or counterclockwise when viewed from above and since the teeth of the spur gear 40 mesh with the teeth of a smaller diameter spur gear 41 this causes the smaller diameter spur gear to rotate in a clockwise direction as viewed from above and this causes the corresponding rotation of the attached shaft 42 whose upper end is rotatably mounted in a bearing 43 that is connected to the partition 38 and whose lower end is rotatably mounted in a bearing 45 that is connected to the floor panel 44. The rotation of the shaft 42 causes the corresponding rotation in a clockwise direction when viewed from above of the attached larger diameter spur gear 46. As the larger diameter spur gear 46 rotates in a clockwise direction the teeth of the larger diameter spur gear engage the teeth of the smaller diameter spur gear 47 and this causes the smaller diameter spur gear 47 to rotate in a counterclockwise direction when viewed from above, and this causes the corresponding rotation of the shaft 48 whose upper end is mounted in the bearing 49 that is connected to the partition 38 and whose lower end is connected to the potentiometer 19 so that the electrical resistance of the potentiometer is varied to produce an electrical signal when electric current is flowing through the potentiometer.

Should the operator desire to vary the resistance of the potentiometer 19 in the opposite direction he merely pulls backward on the lever 16 with his finger so that the mounting member 26 rotates in a rearward direction and this causes the attached shaft 36 and the spur gear 40 to rotate in a clockwise direction when viewed from above. In view of this, the gear train 21 functions in the reverse direction from that previously stated so that the shaft 48 that is connected to the potentiometer 19 rotates in the reverse direction to vary the resistance of the potentiometer in a manner that is reverse to that previously stated.

If the operator desires to vary the resistance of the potentiometer 18, he merely moves the lever 16 in FIG. upward or downward direction so that the lever moves in a vertical plane by inserting the end of his finger or thumb in the hole 23 in the enlarged outer end member 22 of the lever and pushes upward or downward. If the operator pushes upward the lever 16 is pivoted upward and this causes the connected shaft 25 whose ends are rotatably mounted in the bearings 27 that are mounted on the mounting member 26 to rotate in an upward direction or in a counterclockwise direction when the end of the shaft is viewed from the left in FIGURE 2. This also causes the attached relatively large spur gear 28 to rotate upwardly or to rotate counterclockwise when viewed from the left as seen in FIG. 2. Since the teeth of this spur gear 28 mesh with the teeth of the relatively small spur gear 29 as the spur gear 28 rotates in a counterclockwise direction this causes the smaller spur gear 29, the connected shaft 30 and the relatively large spur gear 32 that is connected to this shaft to rotate in a clockwise direction when viewed from the left. Since the teeth of the relatively large spur gear 32 mesh with the teeth of the smaller spur gear 33, the clockwise rotation of the larger spur gear 32 causes the counter-clockwise rotation of the smaller spur gear 33 and the connected shaft 34 to vary the resistance of the potentiometer 18 and to generate an electrical signal when electric current is flowing through the potentiometer.

Should the operator desire to vary the resistance of the potentiometer 18 in the opposite direction from that previously described he merely pushes in a downward direction with the tip of his thumb or finger in the hole 23 in the enlarged outer member 22 and this causes the lever 16 to pivot in a downward direction and results in the connected shaft 25 being rotated in a clockwise direction when viewed from the left in FIG. 2. This clockwise rotation of the shaft 25 causes the attached relatively large spur gear 28 to rotate in a clockwise direction and thus the gear train 20 is caused to operate in the reverse direction from that previously described so that the resistance of the potentiometer 18 is varied in the opposite manner from that just previously described.

During normal use of the dual motion control device 10 the operator varies the position of the lever 16 simultaneous or nearly simultaneously both vertically and horizontally and this results in the simultaneous or nearly simultaneous generation of electrical signals from both of the potentiometers 18 and 19. Since these two input signal sources can be controlled by one finger or thumb without removing the finger or thumb from the input lever 16, the operator is free to use the rest of his hand to control other systems without having to remove his hand from the control member that controls these other systems. This permits the operator to easily control a two input signal system without having to relinquish his control of other primary systems or to unduly remove his attention from such systems.

Upon release of the lever 16, the springs 51 and 53 cause the lever to return to its normal or neutral position and this causes the shafts 34 and 48 that are respectively connected to the potentiometers 18 and 19 to return to their neutral positions so that the potentiometers generate a neutral signal.

It will be appreciated that in view of the meshing of relatively large diameter spur gears with comparatively small diameter spur gears of the gear trains 20 and 21 that for a relatively slight movement of the lever 16 rather large rotational movements of the shafts 34 and 48 that are connected to the respective potentiometers takes place and thus the gear trains provide very good sensitivity and permit relatively large variances of the resistance of the potentiometers from relatively small movements of the operator's finger that is in contact with the lever 16. In the preferred embodiment of the invention each gear train comprises four gears that are adapted to give an overall output to input gear ratio of at least five to one so the gear attached to the shaft of the potentiometer 18 or 19 rotates at least five times the amount as the input gear 28 or 40 that is attached to the respective shafts 25 and 36 in response to the rotation of that appropriate input gear. The use of a gear trains containing a number of gears rather than a few larger gears permits the control device 10 to be compact so that it is adapted to be mounted in front of an aircraft control hand grip as illustrated in FIG. 1.

In FIG. 3 a schematic diagram is illustrated of the control device connected in circuit relationship with an aircraft radar target acquisition scope 54. As illustrated, a battery 55 is connected in parallel with resistance elements 56 and 57 of the respective potentiometers 18 and 19. The negative terminal of the battery 55 and one end of the resistance elements 56 and 57 are connected to the radar target acquisition scope by means of the conductor 58. The wiper arms 59 and 60 that are in contact with the respective resistance elements 56 and 57 of the potentiometers 18 and 19 are connected to the radar target acquisition scope 54 by means of the respective conductors 61 and 62. From FIG. 3 it is apparent that electric current will flow from the positive terminal of the battery 55 through the resistance element 56 to the negative terminal of the battery and that in a similar manner electric current will flow from the positive terminal of the battery through the resistance element 57 to the negative terminal of the battery. Current will also flow from the positive terminal of the battery 55 through a portion of the resistance element 56 then through the wiper arm 59 and through the conductor 61 to the radar acquisition scope 54 to control the vertical or Y axis position of a radar target reticle 63 on the scope. From the radar acquisition scope current then flows through the conductor 58 to the negative terminal of the battery 55. In a similar manner current flows from the positive terminal of the battery 55 through a portion of the resistance element 57, through the wiper arm 60 and through the conductor 62 to the radar acquisition scope 54 to control the horizontal or X axis position of the radar target reticle 63 on the scope. From the radar acquisition scope 54 the current then flows to the negative terminal of the battery through the conductor 58. From the foregoing it is apparent that the position of the radar target reticle 63 can be controlled both in an Y and X or vertical and horizontal direction on the scope 54 by movement of the wiper arms 59 and 60 of the respective potentiometers 18 and 19 to generate the appropriate electrical reticle input signals. It will also be appreciated that these signals can also be used to control other types of systems such as a missile guidance system.

Although the invention has been described with reference to preferred embodiments, it will be understood that variations and modifications may be made within the spirit and scope of the invention as defined in the appended claims.

What is claimed is:

1. Aircraft control apparatus comprising: an aircraft control stick having a control grip at the upper end thereof; a mounting member having its lower portion connected to said aircraft control stick; a control device having a housing connected to the upper portion of said mounting member; first signal source means in said housing for producing an electrical signal; second signal source means in said housing for producing an electrical signal; and finger or thumb operable means operatively connected to both said first and said second signal source means for permitting a finger or thumb to be used to control said first and said second signal source means; said finger or thumb operable means having a portion thereof extending outside of said housing; said mounting member, said housing and the portion of said finger or thumb operable means extending outside of said housing being located with respect to said control grip to permit the portion of the finger or thumb operable means extending outside of said housing to be readily operated by a finger or thumb of a hand that is grasping said control grip.

2. The aircraft control apparatus of claim 1 wherein said housing is located substantially in front of said control grip.

3. The aircraft control apparatus of claim 2 wherein said finger or thumb operable means comprises a lever having an enlarged outer end member.

4. The aircraft control apparatus of claim 3 wherein the enlarged outer end member of said lever has a hole adapted to receive a portion of the tip of the finger or thumb of a hand that is grasping said control grip.

5. The aircraft control apparatus of claim 1 including a first gear train having more than two gears operatively connected to said finger or thumb operable means and said first signal source means and a second gear train having more than two gears operatively connected to said finger or thumb operable means and said second signal source means.

6. The aircraft control apparatus of claim 5 wherein said gear trains each have an output to input travel ratio of at least 5 to 1.

7. Control apparatus for an aircraft comprising: an aircraft control stick; a mounting member having its lower portion connected to said aircraft control stick; a control device having a housing connected to the upper portion of said mounting member; a partition located within said housing; a mounting shaft rotatably mounted in and extending through said partition; a U-shaped mounting member rigidly secured to one end of said mounting shaft, said U-shaped mounting member having two projecting walls; a first mounting member shaft extending between the walls of said U-shaped mounting member and having its ends thereof rotatably mounted in the walls of said U-shaped mounting member; a finger or thumb operable lever connected to said first mounting member shaft, said finger or thumb operable lever having a portion thereof extending outside of said housing; a gear located on and rigidly connected to said first mounting member shaft; a second mounting member shaft extending between the walls of said U-shaped mounting member and having its ends thereof rotatably mounted in the walls of said U-shaped mounting member; a first gear and a second gear located on and rigidly connected to said second mounting member shaft, said first gear on the second mounting member shaft meshing with the gear located on said first mounting member shaft; a third mounting member shaft having one end thereof rotatably mounted in one wall of said U-shaped mounting member; a gear located on and rigidly connected to said third mounting member shaft, said gear on the third mounting member shaft meshing with the second gear located on said second mounting member shaft; first signal source means for producing an electrical signal connected to the opposite end of said third mounting member shaft; a gear rigidly attached to the end portion of said mounting shaft opposite the end thereof connected to said U-shaped mounting member; a panel located within said housing and spaced away from said partition; a first shaft extending between said partition and said panel having the respective ends thereof rotatably mounted in said partition and said panel; a first gear and a second gear located on and rigidly connected to the first shaft extending between the partition and the panel, said first gear on the first shaft extending between the partition and the panel meshing with the gear attached to said mounting shaft; a second shaft extending from said partition having one end thereof rotatably mounted in said partition; a gear rigidly mounted on the second shaft extending from the partition, said gear on said second shaft extending from the partition meshing with said second gear on the first shaft extending between the partition and the panel; and second signal source means for producing an electrical signal connected to the end of said second shaft extending from said partition opposite the end rotatably mounted in said partition.

* * * * *